United States Patent [19]

Schmidt-Hellerau et al.

[11] Patent Number: 4,978,711
[45] Date of Patent: Dec. 18, 1990

[54] AQUEOUS AMINORESIN SOLUTIONS FOR LOW-FORMALDEHYDE SURFACE BONDING

[75] Inventors: Christof Schmidt-Hellerau, Ludwigshafen; Engelbert Weber, Neustadt; Guenther Matthias, Frankenthal, all of Fed. Rep. of Germany

[73] Assignee: BASF Aktiengesellschaft, Ludwigshafen, Fed. Rep. of Germany

[21] Appl. No.: 314,956

[22] Filed: Feb. 24, 1989

[30] Foreign Application Priority Data

Mar. 7, 1988 [DE] Fed. Rep. of Germany ....... 3807402

[51] Int. Cl.$^5$ ...................... C08L 75/00; C08L 61/00; C08F 283/00; C08G 8/28
[52] U.S. Cl. .................................. 524/841; 524/843; 524/541; 525/497; 525/495
[58] Field of Search .................. 524/541, 841, 843; 525/489, 398, 495, 497; 528/232

[56] References Cited

U.S. PATENT DOCUMENTS

| | | | |
|---|---|---|---|
| 3,404,198 | 10/1968 | Guyer | 524/541 |
| 3,547,868 | 12/1970 | Schwartzenburg, Jr. et al. | 524/841 |
| 3,734,918 | 5/1973 | Mayer et al. | 524/541 |
| 4,264,760 | 4/1981 | Meyer | 528/230 |
| 4,285,848 | 8/1981 | Hickson | 524/841 |
| 4,458,049 | 7/1984 | Diem et al. | 524/59 |
| 4,831,089 | 5/1989 | Flodman et al. | 525/497 |
| 4,857,609 | 8/1989 | Flodman et al. | 525/497 |

FOREIGN PATENT DOCUMENTS

| | | |
|---|---|---|
| 0052212 | 5/1979 | European Pat. Off. . |
| 69267 | 6/1982 | European Pat. Off. . |
| 0031533 | 7/1982 | European Pat. Off. . |
| 2020481 | 6/1979 | Fed. Rep. of Germany . |

OTHER PUBLICATIONS

Japanese Patent Abstract 60-40178, v. 9, No. 166 (C-290), 1985.

*Primary Examiner*—Kriellion Morgan
*Attorney, Agent, or Firm*—Keil & Weinkauf

[57] ABSTRACT

Aqueous aminoresin solutions for low-formaldehyde surface bonding, based on condensates of melamine, urea, phenol and formaldehyde having a molar ratio of from 1.4 to 1.8 moles of formaldehyde, from 0.04 mole to 0.1 mole of melamine and from 0.015 to 0.04 mole of phenol per mole of urea, relative to the total amount of the aminoresin, are obtainable by mixing (A) from 20 to 40% by weight of melamine/urea/-phenol/formaldehyde consensate with
(B) from 60 to 80% by weight of a urea/formaldehyde condensate.

7 Claims, No Drawings

AQUEOUS AMINORESIN SOLUTIONS FOR LOW-FORMALDEHYDE SURFACE BONDING

The present invention relates to aqueous aminoresin solutions for low-formaldehyde surface bonding, based on melamine/urea/phenol/formaldehyde condensates having a molar ratio of from 1.5 to 1.8 moles of formaldehyde, from 0.04 to 0.1 mole of melamine and from 0.015 to 0.04 mole of phenol per mole of urea, relative to the total amount of the aminoresin, and their use.

Aqueous aminoresin solutions based on melamine/urea/phenol/formaldehyde condensates for use as adhesive resins have long been known. For example, DE-C No. 20 20 481 describes a process for the preparation of such resin solutions, wherein a condensate solution is first prepared from melamine and/or urea with formaldehyde and is then further reacted with phenol and, if required, formaldehyde and melamine.

The main disadvantage of these resin solutions is that, after curing, the readily released formaldehyde, is undesirable Furthermore, the resin solutions have a limited shelf life.

EP-B No. 00 69 267 describes a process for the preparation of aqueous solutions of condensates of melamine, urea, phenol and formaldehyde, wherein a phenol/formaldehyde condensate and a urea/formaldehyde condensate are first prepared and are then further reacted together with melamine and formaldehyde, with or without further reaction with urea. These resin solutions have improved water dilutability and release less formaldehyde during processing, compared with the prior art. However, the emission of formaldehyde from the finished wooden article and the shelf life of the resin solutions are still insufficient for some applications.

It is an object of the present invention to provide aqueous aminoresin solutions for surface bonding which have a long shelf life, and high reactivity and release less formaldehyde both during use and from the finished material.

Further objects of the present invention are the provision of resin solutions which are relatively highly viscous for surface bonding and, after surface bonding of wooden components, give shaped articles having good strength properties in combination with high flexibility and good water resistance according to DIN 68,705, Class IW 67.

We have found that these objects, some of which are contradictory, are achieved by a resin mixture consisting of a melamine/urea/phenol/formaldehyde condensate and a urea/formaldehyde condensate having narrow molar ratio limits.

The present invention relates to aqueous aminoresin solutions for low-formaldehyde surface bonding, based on condensates of melamine, urea, phenol and formaldehyde having a molar ratio of from 1.5 to 1.8 moles of formaldehyde, from 0.04 to 0.1 mole of melamine and from 0.015 to 0.04 mole of phenol per mole of urea, relative to the total amount of the aminoresin, obtainable by mixing (A) from 20 to 40% by weight of a melamine/urea/phenol/formaldehyde condensate with (B) from 60 to 80% by weight of a urea/formaldehyde condensate.

Regarding the components, the following may be stated specifically.

Component (A) is obtainable by condensation of a mixture which contains from 2.5 to 3.5 moles of formaldehyde, from 0.4 to 0.5 mole of melamine and from 0.1 to 0.2 mole of a phenol per mole of urea, by condensing 1 mole of urea and from 1.5 to 2.5 moles of formaldehyde in a conventional manner to give a correspondingly concentrated aqueous condensate solution having a water compatibility of from 0.5 to 10, and reacting the condensate at a pH of from 7.5 to 10 and at from 45 to 100° C. with from 0.05 to 0.2 mole of phenol, if necessary up to 0.5 mole of formaldehyde and if necessary up to 0.5 mole of melamine, until the aqueous solution reaches a viscosity of from 300 to 2,000 mPa.s, measured at a solids content of 63% by weight and at 20° C.

A higher melamine content generally results in a relatively high formaldehyde content.

For example, an aminoresin can be obtained by first condensing urea and formaldehyde at pH 3–6.5, in particular pH 4–5, and at from 80° to 100° C., an aqueous urea/formaldehyde resin being obtained, and carrying out further condensation of formaldehyde and melamine at pH 7–10 with the addition of a phenol, until the above-mentioned viscosity is reached.

On the other hand, melamine can also be condensed with urea in the first condensation stage. In this case, however, it is advantageous to carry out the reaction in the alkaline range, ie. at pH 7.5–10. The resulting urea/melamine mixed resin is then further condensed with phenol and formaldehyde, if necessary together with a residual amount of melamine, until the desired viscosity is reached. Suitable phenols are phenol, resorcinol, cresols, xylenols and industrial mixtures of these phenols.

Component (A) is used in a concentration of from 20 to 40, preferably from 25 to 35, % by weight.

Component (B) is obtainable in a conventional manner by condensation of 1 mole of urea with from 1.1 to 1.5, preferably from 1.2 to 1.4, moles of formaldehyde. It has a solids content of from 50 to 70% by weight and a viscosity of from 800 to 1,200 mPa.s. The urea/formaldehyde resin can also be prepared in the presence of mono-alcohols and diols of not more than 6 carbon atoms, ether formation taking place in some cases. Suitable mono-alcohols are methanol and ethanol. Suitable diols are ethylene glycol, diethylene glycol, triethylene glycol and propylene glycol. Up to 3.5% by weight, based on component (B), of alcohols may be concomitantly used.

Component (B) is used in a concentration of from 60 to 80, preferably from 65 to 70, % by weight.

Components (A) and (B) are mixed with stirring at room temperature in such a way that from 1.4 to 1.8, preferably from 1.5 to 1.7, moles of formaldehyde, from 0.04 to 0.1, preferably from 0.05 to 0.08, mole of melamine and from 0.015 to 0.04, preferably from 0.02 to 0.03, mole of phenol are used per mole of urea, the amounts being based on the solids content of the aminoresin mixture. The aminoresin mixture has a solids content of from 60 to 80, preferably from 60 to 68, % by weight and a viscosity of from 800 to 1,200, preferably from 800 to 1,000, mPa.s, measured in a solution having 65% by weight of dry residue. The gelling times are from 40 to 50, preferably from 40 to 60, seconds, measured at 100° C. with the addition of 0.75% by weight of ammonium chloride.

These aminoresin solutions have a low formaldehyde emission both during use and from the woodworking materials produced using the said solutions. The shelf life, defined as the time in weeks until the maximum viscosity of 2,500 mPa.s is reached after storage at 25° C, is good and is from 15 to 40 weeks. The solutions are very suitable as adhesive resins for the surface bonding of all types of wood. The strength required for Class IW 67 according to DIN 68,705 is exceeded, even, for example, for beech veneers, which are difficult to glue. Class IW 67 states that the veneered workpiece, after storage in water for 3 hours at 67° C., must not show any parting of joins in the knife-insertion test. This aminoresin solution can be used not only for adhesive bonding but also for coating surfaces of wooden components to give glossy surfaces. For this purpose and for surface bonding, good flexibility is necessary since, for example, laths for bed bases or chair rests are subjected to bending stresses.

The additives conventionally used for the preparation of adhesive resins, eg. curing agents, fillers, extenders, fungicides and additives for improving the cold tack, can also be added to the aminoresin solution, in amounts of not more than 20% by weight.

EXAMPLE 1

Preparation of component (A)

960 g of a commercial aqueous urea/formaldehyde adhesive resin which had a molar ratio of urea to formaldehyde of 1:1.8, a water compatibility of from 1.5 to 2.5 and a solids content of about 65% by weight were condensed with 390.5 g of melamine, 700.5 g of a 40% strength by weight formaldehyde solution and 108.5 g of phenol at 90° C., the pH of the solution being kept constant at 8.5 by the addition of a total of 10 g of 25% strength by weight aqueous sodium hydroxide solution, until the viscosity of the resin solution had reached about 700 mPa.s (20° C.). This was the case after about 100 minutes.

Preparation of the aminoresin solution 30 g of component (A) were mixed with 70 g of a high viscous urea/formaldehyde condensate having a molar ratio of urea to formaldehyde of 1:1.35, an ethylene glycol content of 1.2% by weight, a solids content of 66.5% by weight and a content of free formaldehyde of 0.35% by weight, at room temperature to give an aminoresin solution, the properties of which are shown in Table 1.

EXAMPLE 2

40% by weight of component A were mixed with 60% by weight of component B, the latter being a urea/formaldehyde resin having the following characteristic properties: molar ratio of urea to formaldehyde=1:1.25, ethylene glycol content=0.9% by weight, methanol content 0.8% by weight, solids content=66.8% by weight, free formaldehyde=0.2% by weight, free urea=10.7% by weight.

EXAMPLE 3

20% by weight of component A were mixed with 80% by weight of component B, the latter having the same composition as in Example 1.

COMPARATIVE EXAMPLE

Here, the highly viscous urea/formaldehyde condensate (UF resin) from Example 1 was used.

TABLE 1

|  | 1 | 2 | 3 |
|---|---|---|---|
| Formaldehyde % by weight | 31.1 | 30.1 | 31.4 |
| Urea % by weight | 38.4 | 36.9 | 41.2 |
| Melamine % by weight | 5.4 | 7.2 | 3.6 |

TABLE 1-continued

|  | 1 | 2 | 3 |
|---|---|---|---|
| Phenol % by weight | 1.54 | 2.0 | 1.0 |
| Ethylene glycol % by weight | 0.84 | 0.54 | 0.96 |
| Viscosity mPa.s | 932 | 902 | 979 |
| Solids content % by weight | 64.0 | 64.7 | 66.2 |
| Density g/cm$^3$ | 1.284 | 1.289 | 1.295 |
| pH | 8.95 | 9.10 | 9.0 |
| Free formaldehyde % | 0.37 | 0.33 | 0.40 |
| Hydroxymethyl % by weight | 19.2 | 18.2 | 19.7 |
| Miscibility with water | 1:0.8 | 1:0.6 | 1:12 |
| Shelf life at 25° C. until 2,500 mPa.s is reached | 16 weeks | 18 weeks | 11 weeks |
| Gelling time at 100° C. s | 59 | 50 | 65 |
| Free urea % by weight | 2.2 | 4.1 | 3.3 |

Preparation of test specimens

The additives stated in Table 2 were added to the aminoresin solutions of the Examples and the mixture was used to produce 5-ply 1.5 mm beech plywood boards under the production conditions stated in Table 2. The wood type chosen was beech because it
(a) is the most difficult type to glue and
(b) has the highest gas permeability.
Thus, the most difficult test conditions were chosen.

TABLE 2

|  | 1 | 2 | 3 | UF resin molar ratio 1:1.8 |
|---|---|---|---|---|
| Aminoresin | 100 | 100 | 100 | 100 |
| Coconut shell meal | 15 | 15 | 15 | 15 |
| Curing agent: (31% by weight of glutaric acid 25% by weight of urea 7.5% by weight of ammonia 36.5% by weight of water) | 10 | 10 | 10 | 10 |
| 98% strength by weight ammonium chloride solution | 3 | 3 | 3 | 3 |
| Wheat meal | 5 | 5 | 5 | 5 |
| Data: |  |  |  |  |
| Viscosity at 20° C. mPa.s | 3420 | 3120 | 3870 | 3230 |
| Glue application g/m$^2$ | 200 | 200 | 200 | 200 |
| Wood type | 5 × 1.5 mm beech | | | |
| Pressure N/mm$^2$ | 1.4 | 1.4 | 1.4 | 1.4 |
| Compression time at 100° C. (min) | 6 | 6 | 6 | 6 |
| Testing of boards |  |  |  |  |
| *Dry tear value N/mm$^2$ | 4.13 | 3.86 | 3.45 | 3.86 |
| Wood fiber tear % | 82 | 94 | 90 | 74 |
| Insertion value | 1–2 | 1–2 | 2 | 2 |
| *Tear value after 24 h in water N/mm$^2$ at 20° C. | 3.18 | 3.43 | 2.80 | 3.43 |
| *wood fiber tear % | 84 | 100 | 80 | 70 |
| Insertion value | 1–2 | 1–2 | 2 | 2–3 |
| *Tear value after 3 h in water N/mm$^2$ at 67° C. | 2.79 | 3.12 | 2.26 | 2.19 |
| *Wood fiber tear % | 14 | 96 | 11 | 0 |
| Insertion value (2nd to 4th hour) | 2–3 1.9 | 2 2.9 | 2–3 1.7 | 3–4 4.4 |

* = Mean value for 4 boards with 5 test specimens each Gas analysis, DIN 52,368: (narrow surfaces protected) mg of HCHO/m$^2$h Even in the IF test (24 hours in water at 20° C.), the novel resins 1 to 3 have a better rating compared with the UF resin compared for the insertion value: Rating 1: 100% breakage of the wood (very good) Rating 2: 70% of the pricked area shows breakage of wood (good) Rating 3: 35% of the pricked area shows breakage of wood (adequate) Rating 4: 0% of the pricked area shows breakage of wood (inadequate)

In the test according to IW 67 (3 hours in water at 67° C.), the UF resin gives an unsatisfactory adhesive bond, whereas the novel resins are good.

The gas analysis values according to DIN 52,368 which relate to formaldehyde emission demonstrate the superiority of the novel resins over the UF resin.

The melamine/urea/phenol/formaldehyde resin on which the novel resins are based has not been described in detail here but gives very good board properties and has a shelf life of only 7 weeks and a formaldehyde emission of about 5 mg per m² per hour, ie. an excessively high value.

A UF resin having a molar ratio of formaldehyde to urea of 1.35:1 and a viscosity of 800 mPa.s has a shelf life of only 7 weeks at 25° C. Thus, the novel aminoresin solutions show a surprising effect compared with the individual components.

Coating a bed lath

Bent bed laths were produced using the aminoresin solution of Example 1, according to Table 2, except that 7 1.2 mm thick beech veneers were glued together lengthwise. Some of the bed laths were coated with the following mixture: 150 g/m² of glue liquor consisting of 75% by weight of adhesive resin, 15% by weight of wheatmeal and 10% by weight of a curing agent. The curing agent was a solution of 12.5 g of ammonium chloride and 37.5 g of urea in 50 g of water. Coating and compression of the board were carried out simultaneously, ie. the coating liquor was added prior to compression.

The formaldehyde elimination (gas analysis) was 1.9 mg per m² per hour for the uncoated boards and 0.16 mg per m² per hour for the coated boards.

We claim:

1. An aqueous aminoresin solution for low-formaldehyde surface bonding based on condensates of melamine, urea, phenol and formaldehyde having a molar ratio of from 1.4 to 1.8 moles of formaldehyde, from 0.04 to 0.1 mole of melamine and from 0.015 to 0.04 mole of phenol per mole of urea, relative to the total amount of the amino resin, obtainable by mixing
    (A) from 20 to 40% by weight of a melamine/urea/phenol/formaldehyde condensate with
    (B) from 60 to 80% by weight of a urea/formaldehyde condensate.

2. The aminoresin solution of claim 1, obtainable while maintaining a molar ratio of from 1.5 to 1.7 moles of formaldehyde, from 0.05 to 0.08 mole of melamine and from 0.02 to 0.03 mole of phenol per mole of urea, relative to the total amount of the aminoresin.

3. The aminoresin of claim 1, obtainable using a component (A) which is prepared using from 2.5 to 3.5 moles of formaldehyde, from 0.4 to 0.5 mole of melamine and from 0.1 to 0.2 mole of phenol per mole of urea.

4. The aminoresin solution of claim 1, obtainable using a component (B) which is prepared having a molar ratio of urea to formaldehyde of from 1:1.1 to 1:1.5.

5. The aminoresin solution of claim 1, obtainable using a component (B) which has been modified with a monoalcohol or with a diol.

6. An aminoresin solution of claim 1, which has a solids content of not less than 60% by weight.

7. The aminoresin solution of claim 1, which has a solids content of 65% by weight and a viscosity, at 20° C., of from 800 to 1,200 mPa.s.

* * * * *